W. F. SCHANZLIN.
COMBINED HAY TEDDER AND MOWER.
APPLICATION FILED AUG. 13, 1909.
957,628.
Patented May 10, 1910.
2 SHEETS—SHEET 1.
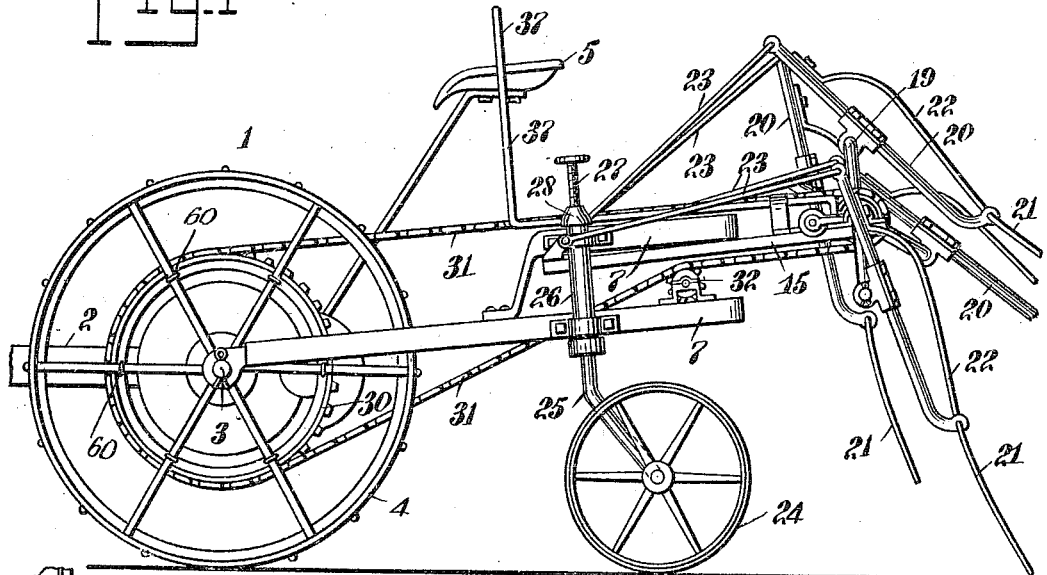
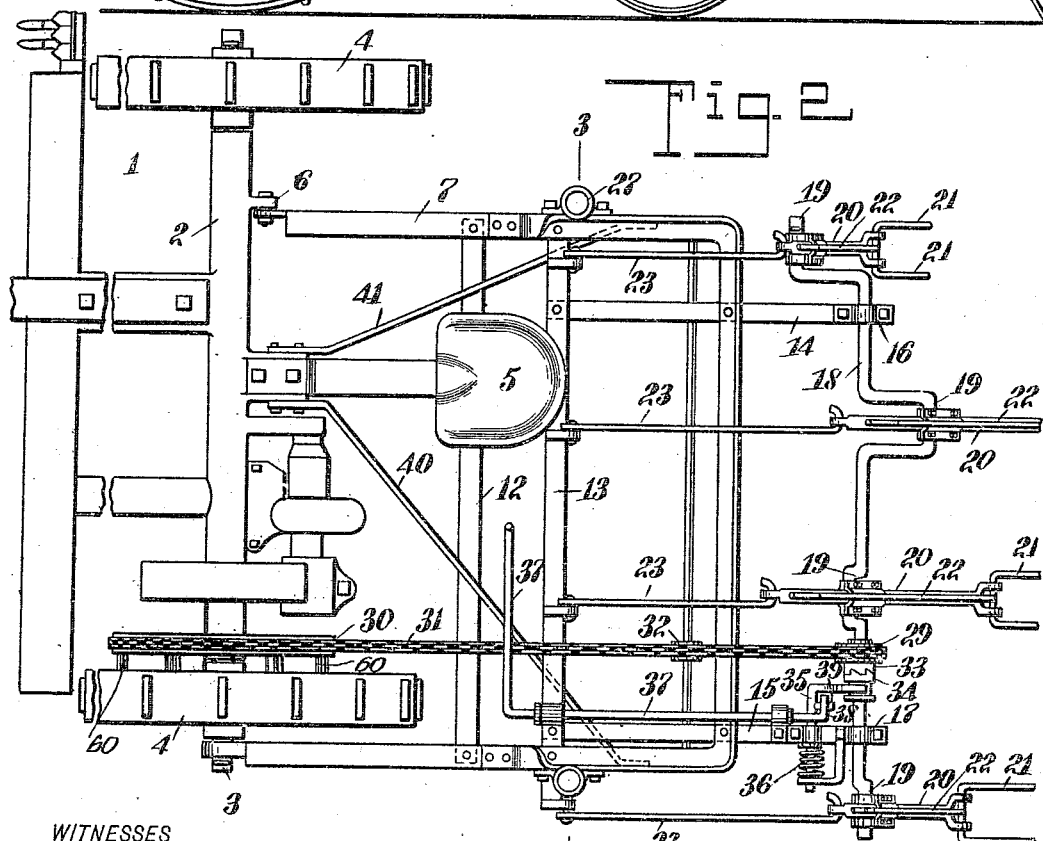
WITNESSES
INVENTOR
William F. Schanzlin
BY
ATTORNEYS W. F. SCHANZLIN.
COMBINED HAY TEDDER AND MOWER.
APPLICATION FILED AUG. 13, 1909.
957,628.
Patented May 10, 1910.
2 SHEETS—SHEET 2.
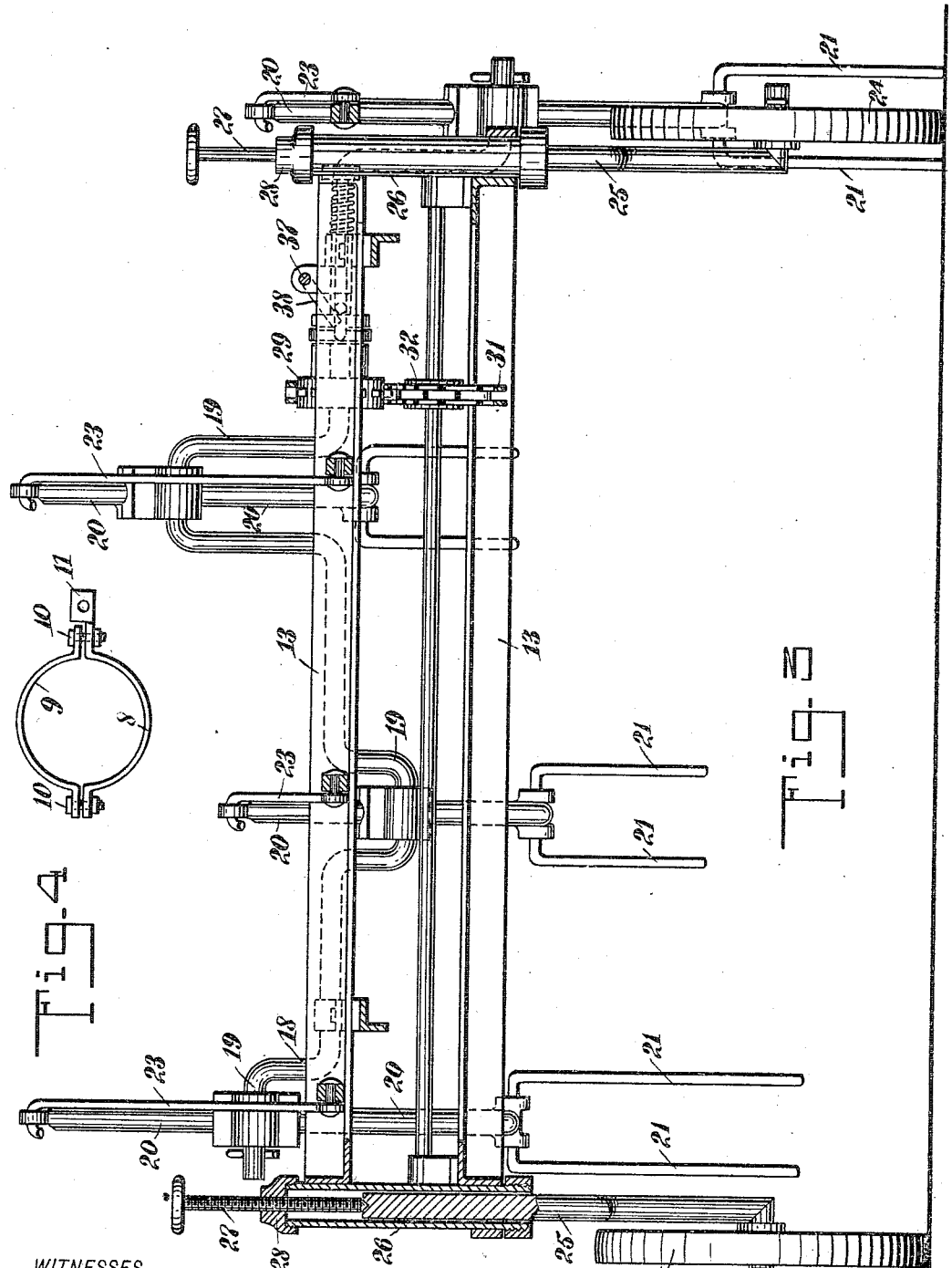
WITNESSES
J. H. Brophy
H. Whiting
INVENTOR
William F. Schanzlin
BY
ATTORNEYS

UNITED STATES PATENT OFFICE.

WILLIAM FREDRICK SCHANZLIN, OF LIMA, OHIO.

COMBINED HAY TEDDER AND MOWER.

957,628.  Specification of Letters Patent.  Patented May 10, 1910.

Application filed August 13, 1909.  Serial No. 512,654.

*To all whom it may concern:*

Be it known that I, WILLIAM F. SCHANZLIN, a citizen of the United States, and a resident of Lima, in the county of Allen and State of Ohio, have invented a new and Improved Combined Hay Tedder and Mower, of which the following is a full, clear, and exact description.

This invention relates to a new and improved hay tedder, to be attached to and combined with a mower.

An object of this invention is to provide means whereby the hay can be tedded and turned during the mowing operation.

A further object of the invention is to provide a device which will be simple in construction, strong, durable, inexpensive to manufacture, and rapid and clean in its operation.

A still further object of the invention is to provide simple and positive means for adjusting the height of the tedder frame from the ground.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1 is a side view, in elevation; Fig. 2 is a top plan view; Fig. 3 is a vertical cross section on the line 3—3 in Fig. 2, looking from the front to the rear; and Fig. 4 is a detail view showing a form of clamp to be used in attaching the tedder frame to the mowing machine frame.

Referring more particularly to the separate parts, as illustrated in the drawings, 1 indicates a mower or mowing machine of any suitable structure, the frame 2 of which is supported by a suitable axle 3 on traction wheels 4. The mowing mechanism (not shown) is driven from the axle 3 in any well known manner. There is provided a seat 5, secured in any well known manner to the frame 2, for the operator of the machine.

Pivotally secured to the axle 3 at one end, and to a lug 6 on the frame 2 at the other end in any well known manner, there is provided a tedder frame 7. The tedder frame 7 is further braced on the mower frame 2 by means of diagonal braces 40 and 41, which are secured in any well known manner on the frames 2 and 7. This frame is adapted to be attached to any mowing machine, and when the lug 6 is not found thereon, there is provided a clamp, illustrated in Fig. 4, which consists of two members 8 and 9, which are adjustably secured together in any well known manner, as by means of bolts 10. One of the clamping members 8 has a perforated lug 11 extending therefrom, which corresponds to the lug 6, and the frame 7 may be secured to it by means of a suitable bolt or rivet.

The frame 7 is made of any suitable material, such as angle iron, and is preferably U-shaped in form, and is also counter-braced by cross beams 12 and 13. Secured to the frame 7 and the cross beams 13, there are provided suitable extension members 14 and 15, which extend rearwardly on the frame 7 and have journaled in their outer ends in suitable bearings 16 and 17, a shaft 18, which is provided with a plurality of bends set at angles to each other, to form cranks 19.

Pivotally secured to each of the cranks 19 in any well known manner, there are provided tedding forks 20. There are provided on the forks 20, suitable spring tines 21 which are movably secured to the lower end of the shank of the forks 20, and have extending upwardly spring arms 22, which yieldingly hold the tines at their proper angle. The upper ends of the forks 20 are pivotally secured to the cross bar 13 on the frame by any suitable means, such as connecting links 23.

In order to adjust the height of the frame 7, and thus adjust the point at which the tines dig into the hay on the ground, there are provided suitable supporting wheels 24 for the frame, which are pivotally secured on the lower end of angular-shaped pins 25, which telescope into casings 26, secured in any well known manner on the sides of the frame 7. The upper ends of the pins 25 abut against the lower ends of adjusting screws 27, which screw into caps 28 secured in any well known manner to the tops of the casings 26. The lower ends of the adjusting screws 27 are conical in shape, and fit in conical cavities in the upper ends of the pins 25, thereby permitting the pins 25 to rotate, thus allowing the wheels 24 to act as casters and follow the twists and turnings of the mowing machine without any additional steering apparatus. By revolving the screws 27, the height of the machine above the ground is easily regulated. In order to drive the crank shaft 18, and thus operate the tedding forks 20, there is provided on the crank shaft a sprocket wheel 29, which is loosely mounted on the crank shaft 18 and driven by means of a sprocket chain 31 from a sprocket wheel 30 secured by means of the ties 60 to the spokes of one of the traction wheels.

There is provided on the frame 7 a suitable guide sprocket 32, which is rotatably supported on the frame 7 in any well known manner, and is adapted to keep the chain 31 away from the frame and guide it properly on the sprocket 29. In order to connect the crank shaft 18 in driving relation to the sprocket 29, there is provided a clutch member 33, secured on one side of the sprocket 29, which is adapted to engage a facing clutch 34, splined onto the crank shaft 18. The clutch 34 is thrown into and out of engagement by a member 35, which is slidingly supported on the extension 15 in any well known manner, and engages in a groove in the clutch 34. This member 35 is normally pressed by a spring 36, so as to keep the clutch 34 normally in engagement with the clutch 33. In order to throw the clutch 34 out of engagement with the clutch 33, there is provided a hand-operated lever 37, which extends in juxtaposition to the operator's seat 5 at one end, and is journaled intermediate its ends in any well known manner on the frame 7. At the opposite end, the lever 37 is provided with a short arm 38, which is adapted to engage a lug 39 on the clutch-throwing member 35, to force it against the tension of the spring 36, and thereby draw the clutch 34 out of engagement with the clutch 33.

In the operation of the device, the mowing machine is drawn over the field by any suitable motive power, such as horses, and a swath cut. On the return of the mowing machine to cut the next swath, the hay tedder tilts or kicks over the swath previously cut, thereby exposing it to the drying action of the air and sun. The operation is continuous, the mowing and tedding operation going on simultaneously, the tedder turning the swath previously cut, simultaneously with the cutting of the next swath. The drag on the mowing machine is very slight, and can be taken care of, if necessary, by an additional horse.

A great saving of time and labor is accomplished by this machine, as it exposes the hay almost immediately to the drying action of the air and sun. The saving of time especially is very valuable on showery and cloudy days, when a vast amount of hay is spoiled because of slow drying.

Having thus described my invention, I claim as new and desire to secure by Letters Patent:—

1. In a device of the class described, the combination with a mower, of a hay tedder connected to said mower, means for driving said hay tedder from said mower, and means for adjustably supporting said hay tedder, comprising hollow casings, pins telescoping in said casings, wheels rotatably supported on said pins, and adjusting screws adjustably supported in said casings and resting on said pins.

2. In a device of the class described, the combination with a mower, of a hay tedder connected to said mower, said hay tedder comprising a frame, a crank shaft pivoted to said frame, forks pivoted to said crank shaft, links connecting said forks with said frame, a sprocket on said crank shaft, a clutch for connecting said sprocket to said crank shaft, driving connections between said sprocket and said mower, and means for adjustably supporting said hay tedder, comprising hollow casings, pins telescoping in said casings, wheels rotatably supported on said pins, and adjusting screws adjustably supported in said casings and resting on said pins.

In testimony whereof I have signed my name to this specification in the presence of two subscribing witnesses.

WILLIAM FREDRICK SCHANZLIN.

Witnesses:
  J. H. O'CONNOR,
  EUGENE O'KEEFE.